UNITED STATES PATENT OFFICE.

THOMAS I. MURPHY, OF ST. LAWRENCE, SOUTH DAKOTA.

SOLUTION FOR TREATMENT OF IRON AND STEEL.

1,351,961.     Specification of Letters Patent.     Patented Sept. 7, 1920.

No Drawing.     Application filed May 4, 1918. Serial No. 232,574.

*To all whom it may concern:*

Be it known that I, THOMAS I. MURPHY, a citizen of the United States of America, residing at St. Lawrence, in the county of Hand and State of South Dakota, have invented certain new and useful Improvements in Solutions for Treatment of Iron and Steel, of which the following is a specification.

The present invention relates to an improved solution for the treatment of iron and steel, and while the invention is particularly described hereinafter for tempering or hardening soft-center steel plowshares, it will be understood of course that other articles of iron and steel may be treated with equal facility and successful results for the purpose of hardening the metal.

The solution is especially adapted for hardening the sharp edge of the plow share, so that, in subsequent use, the edge will not turn or break out, and in addition, the dipping of the share in the solution aids in scouring the share, thus eliminating, to some extent, subsequent work on the share.

By the utilization in actual practice of the hereinafter described solution, I have found that the process of heating and quenching materially increases the toughness or tensile strength of the metal, and in the following specification I have set forth one complete example of the physical embodiment of my solution, in which the ingredients or elements are proportioned or mixed according to the best mode or formula I have so far devised to form the practical application of the principles of the invention.

In the preparation of the solution for hardening or tempering the plow shares, I utilize as a characteristic hardening element, coarse salt, dissolved in water, preferably rain water or "soft" water, and to this is added sal ammoniac, coarse salt, muriatic acid, and powdered alum, the formula for the solution being stated approximately as follows:—

| Ingredients. | Per cent. | Quantity. |
|---|---|---|
| Water | 85% | 360 lbs. |
| Sal ammoniac | .7% | 3 " |
| Coarse salt | 11.7% | 50 " |
| Muriatic acid | 1.9% | 8 " |
| Powdered alum | .7% | 3 " |
| | 100% | 424 " |

The powdered alum is dissolved in the liquid after the salt is dissolved and the alum is an agency especially adapted for toughening the steel or metal, the sal ammoniac, in addition to the coarse salt, also hardens the metal, while the muriatic acid is a special cleansing agency for the metal.

The solution is thoroughly mixed and the liquid contained in a vessel into which the plow shares are to be dipped or submerged, and the plow-shares are plunged into the solution while red hot and kept submerged until cool, then withdrawn and handled in usual manner, the result being that the metal is toughened or hardened as above indicated.

I claim:—

A solution for the treatment of iron or steel containing water 85%, coarse salt 11.7% dissolved therein, muriatic acid 1.9%, dissolved powdered alum .7%, and sal ammoniac .7%.

In testimony whereof I affix my signature.

THOMAS I. MURPHY.